A. R. Arnold. Sheet 1, 3 Sheets.

Milling Mach.

No. 3,588. Reissued Aug. 10, 1869.

Witnesses;

W. L. Bennett

John Rathbone Jr.

Assignee.

American Standard Tool Co.

by their attorney

C. S. Renwick

A. R. Arnold. Sheet 2, 3 Sheets.
Milling Mach.
No. 3,588. Reissued Aug. 10, 1869.
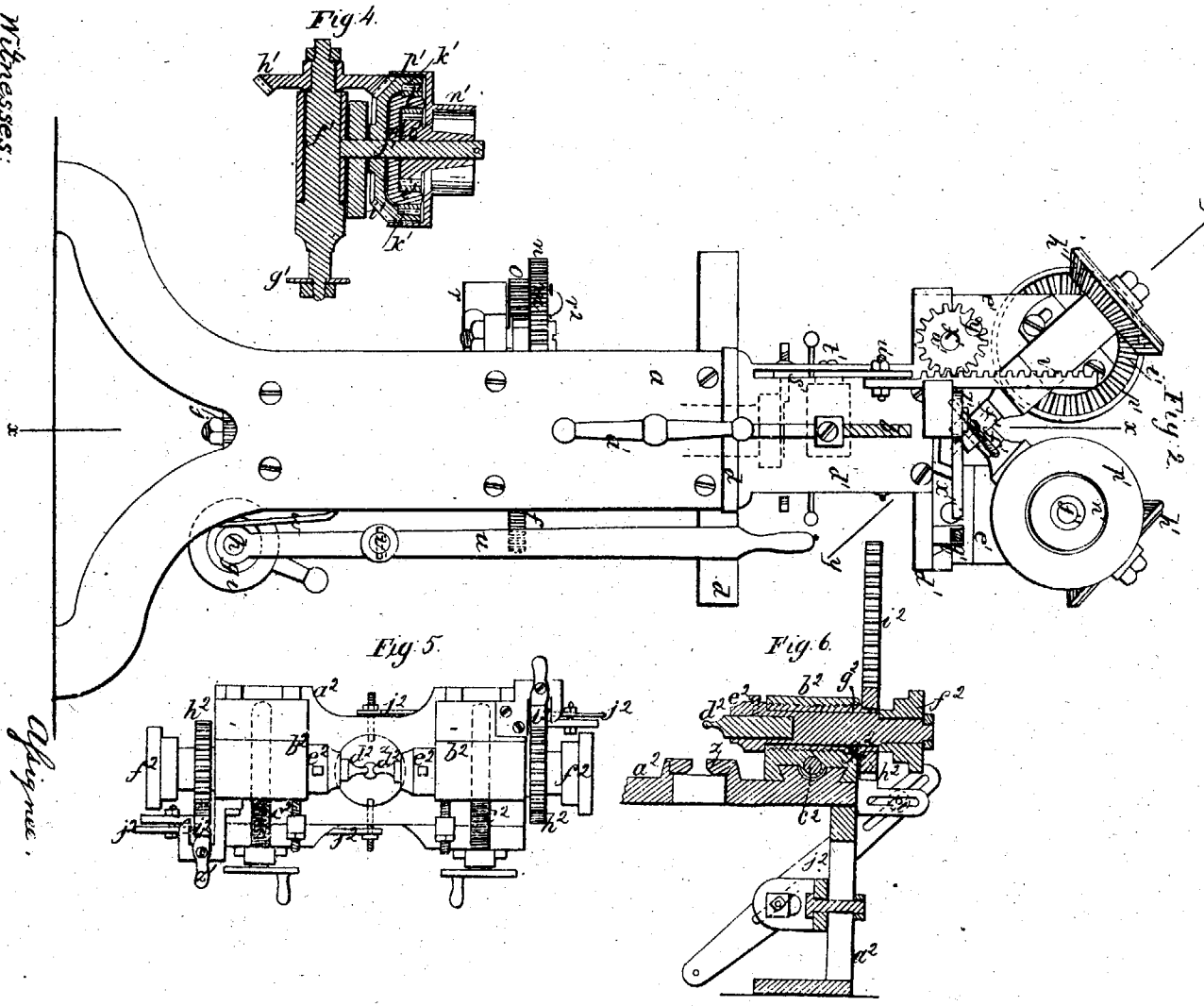
Witnesses;
W. L. Bennett
John Rathbone Jr
Assignee.
American Standard Tool Co.
by their attorney
C. S. Kenrick A. R. Arnold. Sheet 3. 3 Sheets.

Milling Mach.

No. 3,588. Reissued Aug. 10, 1869.

Witnesses:

H. L. Bennett

John Rankine Jr

Assignee

American Standard Tool Co by their Attorney

E. S. Renwick

United States Patent Office.

AMERICAN STANDARD TOOL COMPANY, OF NEWARK, NEW JERSEY, ASSIGNEES, BY MESNE ASSIGNMENTS, OF ANDREW R. ARNOLD.

*Letters Patent No.* 44,037, *dated August* 30, 1864; *reissue No.* 3,588, *dated August* 10, 1869.

IMPROVED MACHINE FOR MAKING TWIST-DRILLS.

The Schedule referred to in these Letters Patent and making part of the same.

*To all whom it may concern:*

Be it known that I, ANDREW R. ARNOLD, of Newark, in the State of New Jersey, have invented certain new and useful Improvements in Machinery for Making Twist-Drills; and that the following is a full, clear, and exact description and specification of the same.

My invention consists of certain new combinations of mechanical instrumentalities, the primary object of the combinations being the cutting of the grooves of twist-drills automatically, but the invention being useful also for other purposes.

The mechanical instrumentalities, which form members of my new combinations, are the following, viz:

First, a revolving cutter-arbor, whose function is to carry and impart motion to a rotating toothed cutter, whose profile is adapted to the form of the groove to be cut.

Second, a revolving mandrel, whose function is to carry the blank in which the groove or grooves are to be cut, and to turn the same on its axis, so as to present every side of it in succession to the rotating cutter.

Third, advancing-mechanism, consisting of a screw, or its equivalent, by means of which the revolving mandrel is advanced longitudinally while it revolves, so as to cause the blank carried by it to both turn and advance as it passes by the rotating cutter.

Fourth, a variable stud for the cog-gearing, that combines the advancing-mechanism with the revolving mandrel, so that the relative speeds of the revolving and longitudinal or advancing movements of said mandrel may be changed by changing the connecting-gearing, the variable stud permitting such change to be made, and being adapted to it.

Fifth, a stop-mechanism, combined with the revolving mandrel, in such manner that it will disengage the same from the mechanism that drives it, so as to stop its revolving and advancing movements, when the blank has been advanced past the rotating cutter a predetermined distance.

Sixth, a tubular guide, arranged in the vicinity of the point at which the rotating cutter operates, said guide being constructed so as to surround the blank, and to maintain it in its proper position, during cutting, against lateral pressure in every direction.

Seventh, a poppet-head, for the revolving arbor that carries the toothed cutter, which poppet-head is so combined with the revolving mandrel that the distance between the axial line of the mandrel and the periphery of the toothed cutter is changed as the mandrel advances longitudinally, whereby the position of the rotating cutter, laterally to the blank, is changed automatically during the operation of cutting, and the said cutter is caused to cut a groove of unequal depth or distance from the axis of the blank, at different parts of its length.

Eighth, a variable fulcrum and connecting-lever, or their equivalent, by means of which the relationship, existing between the movements of the revolving mandrel and the poppet-head of the rotating cutter-arbor, may be changed, so as to vary the inequality in the depth of the groove cut.

The first of my aforesaid combinations is composed of the first, second, third, and fifth of the aforesaid instrumentalities, the practical effect of this combination being to enable a helical groove to be cut in a blank, by means of a rotating cutter, and the cutting to be stopped automatically at the desired point, thereby dispensing with the necessity of watching the machine for the purpose of stopping it, and enabling one attendant to take charge of several machines.

My next combination is composed of two revolving cutter-arbors, as aforesaid, and the second, third, and fifth of the aforesaid instrumentalities, the said two arbors being arranged at different sides of the axial line of the revolving mandrel, so that two helical grooves, of any desired length, may be cut simultaneously by rotating cutters.

My next combination is composed of the first, second, third, and fourth instrumentalities aforesaid, the practical effect of this combination being to enable the same machine to cut automatically helical grooves, of different pitches, by a rotating cutter.

My next combination is composed of the first, second, third, and fourth instrumentalities, and an additional revolving cutter-arbor, as aforesaid, the two revolving cutter-arbors being arranged to act at different sides of the axial line of the mandrel, so that the same machine may be used to cut automatically pairs of grooves of different pitches.

My next combination is composed of the first, second, third, and sixth instrumentalities, the practical effect of this combination being to sustain the blank against lateral pressure while it is being turned, advanced, and moved past the rotating cutter. Hence, blanks of small dimensions may be efficiently cut helically and automatically by a rotating cutter, without risk of springing them so that their axes would vary from a straight line. This combination also enables a dead-centre for the point of the blank to be dispensed with, and, therefore, enables the blanks to be applied to and withdrawn from the machine with rapidity.

My next combination is composed of the first, second, third, and sixth instrumentalities aforesaid, and an additional revolving cutter-arbor, the two cutter-arbors in this combination being arranged at different sides of the axial line of the mandrel, so that the blank is firmly supported, while two helical grooves are simultaneously cut in its substance automatically by rotating cutters.

My next combination is composed of the first, second, third, and seventh instrumentalities aforesaid, the practical effect of this combination being to enable a helical groove, varying progressively in depth or distance of its bottom from both the axis and the surface of the blank, to be cut automatically by a rotating cutter, uncontrolled by the exterior form of the blank. Hence, when cylindrical twist-drills are cut, by means of this combination, the grooves may be cut progressively shallower as they extend toward the shank of the drill, thereby leaving the drill stronger than it would be if the groove or grooves were of equal depth throughout their length.

My next combination is composed of the second and third instrumentalities aforesaid, combined with two sets of the said first and seventh instrumentalities, the said two sets in this combination being arranged at different sides of the axial line of the revolving mandrel. Hence, when cylindrical twist-drills are cut by means of this combination, two progressively-shallower grooves may be cut simultaneously and automatically.

My next combination is composed of the first, second, third, seventh, and eighth instrumentalities, the practical effect of the combination being to enable the progressive change in the depth of the helical groove, as cut by the rotating cutter, to be varied automatically and independently of the exterior form of the blank, to suit blanks of different sizes or forms. Hence the same machine may be used to cut helical grooves having a great variety of tapers or progressive changes in depth from the exterior surface or periphery of the blank.

My next combination is composed of the second and third instrumentalities aforesaid, combined with two sets of the first, seventh, and eighth instrumentalities aforesaid, the said two sets being arranged at different sides of the axial line of the revolving mandrel. The practical effect of this combination is to enable the progressive change in the depth of two helical grooves, that are being cut by rotating cutters, to be varied simultaneously and automatically.

In embodying my invention in a practical form, I have also invented the following new combinations, viz:

The combination, in the same machine, of the first, second, third, fourth, and fifth instrumentalities aforesaid.

The combination, in the same machine, of the first, second, third, fifth, and sixth instrumentalities aforesaid.

The combination, in the same machine, of the first, second, third, fifth, and seventh instrumentalities aforesaid.

In order that my invention may be fully understood, I have represented in the accompanying drawings, and will proceed to describe a machine in which all my combinations are embodied in forms suitable for the cutting of the helical grooves in twist-drills.

Figure 2 is a side elevation of the same;

Figure 4 is a section (at *y y* of fig. 2,) in the plane of the axis of one of the toothed cutters, to exhibit the arrangement of the gearing for driving the toothed cutters;

Figure 5 is a top view of the modification for finishing the grooves of the twist-drills;

Figure 6 is a vertical section through the axis of one of the cutters;

In the accompanying drawings—

Figure 1:
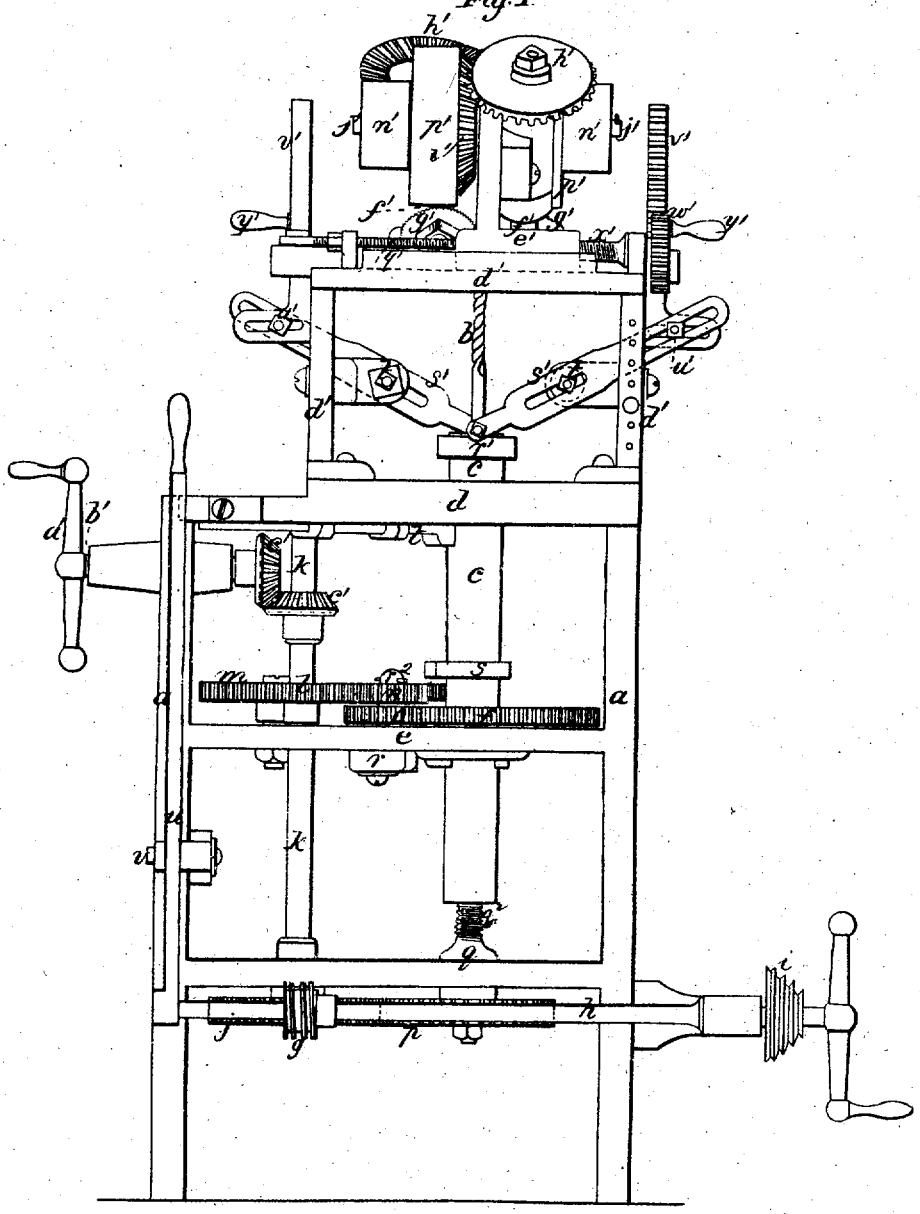
Figure 1 is a front elevation of the machine.
Figure 10:
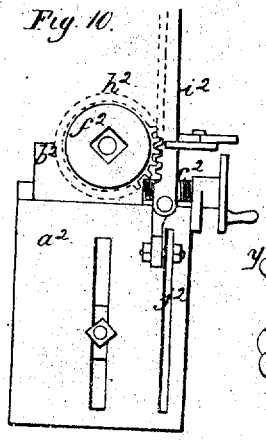
Figure 10 is an end view of the modification represented by fig. 5.
Figure 3:
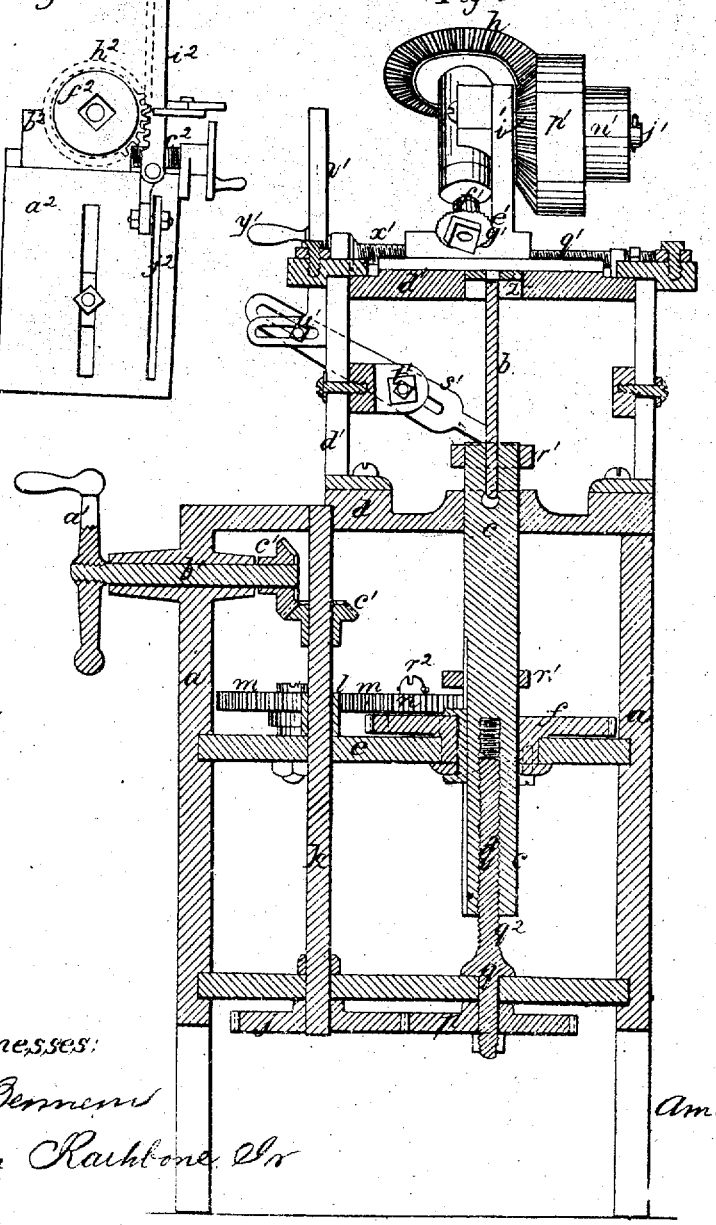
Figure 3 is a vertical section (at *x x*, fig. 2,) in the plane of the axis of the mandrel.
Figure 7:
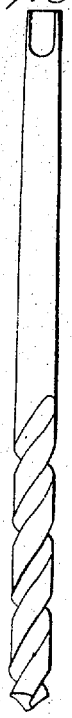
Figures 7 and 8 are a side elevation and an end view of a twist-drill as grooved by toothed cutters.

*a* represents the main frame of the machine.

To the top of the cross-bar *d*, or cap of this main frame, is secured, by screws or other suitable means, an auxiliary frame, $d^1$, on the top of which are mounted two poppet-heads $e^1$ $e^1$, which are constructed to slide horizontally in parallel ways.

In each poppet is mounted an arbor or spindle, $f^1$, which carries, at its inner end, a toothed or burr-cutter, $g^1$, the profile of which is made to suit the form of groove to be cut in the blank.

The inclination of these two arbors is to be such, that the inclination of the planes of the two toothed cutters shall correspond with the pitch of the twist to be cut in the blank, and the two arbors are inclined in opposite directions.

As it is desirable to set the machine for cutting twist-augers of different twist, the boxes, in which the arbors or spindles $f^1$ are mounted, are attached to the poppets by screw-bolts passing through elongated slots. In this way the arbors can be set at any desired inclination.

Each arbor, $f^1$, carries a bevel-cog wheel, $h^1$, at its upper end, which meshes into the cogs of another bevel-cog wheel, $i^1$, that turns on a stud-pin, $j^1$.

At the opposite or outer face of the bevel-wheel $i^1$, is a rim, $k'$, with cogs on its inner periphery, which engage the cogs of the two pinions, $l'$ $l'$, that turn on stud-pins arranged on opposite sides of the axis of the bevel-wheel, and which are attached to a plate, $m'$, on the stud-pin $j^1$, on which the bevel-wheel $i^1$ turns.

The pulley $n'$ (by which the arbors are driven by a belt from some motor,) is mounted to turn on the stud-pin $j^1$, and on its inner face it carries a pinion, $o'$, which drives the two pinions, $l'$ $l'$, and these, in turn, drive the bevel-cog wheel $i^1$, which is cogged on its inner periphery $k'$, and this bevel-wheel drives the arbor.

The inner face of the pulley $n'$, which carries the pinion $o'$, may be made of enlarged diameter, with a rim, $p'$, extending over the rim of the bevelled wheel, and the outside of this rim is in the form of and can be used as a pulley, when desired.

The blank or cylindrical rod of steel, which is being formed or cut, is represented at *b*.

The lower end of this blank is inserted in a central socket at the upper end of a cylindrical mandrel, *c*, which is fitted to turn, and slide longitudinally in a suitable box or bearing in the cross-bars *d* of the frame; and it also slides longitudinally in the eye of a cog-wheel, *f*, to which it is feathered, so as to be turned by it.

A slow rotary motion is imparted to the mandrel *c*, by a worm, *g*, on the horizontal driving-shaft *h*, which carries a cone-pulley, *i*, to receive a band from some motor.

The worm *g* drives a worm-wheel, *j*, at the lower end of a vertical shaft, *k*, which carries a pinion, *l*, and this pinion, by the train of wheels and pinion *m n o*, drives the wheel *f* on the mandrel *c*.

In this way, a slow rotary motion is given to the mandrel and the blank *b*, which it carries, which rotary motion can be increased or diminished at pleasure, by driving the cone-pulley at greater or less speed.

Whilst the mandrel is rotated, as above described, it is gradually advanced, or caused to move longitudinally, by a regular motion, derived from the same source as the rotary motion.

The worm-wheel *j*, at the lower end of the vertical shaft *k*, drives a cog-wheel, *p*, on the lower end of a shaft, *q*, and the upper end of this shaft is threaded, to form a screw, $q^2$, which is fitted to the lower end of the mandrel *c*, which is made hollow and threaded for that purpose. The screw, which thus constitutes the advancing-mechanism of the machine, is thus combined with the mandrel through the cog-gearing *p j l m n o f* and the shaft *k*, so that the mandrel is both turned and compelled to advance automatically.

The cog-wheel and pinion *n o*, before described, are mounted and turn on a stud, $r^2$, projecting from a bracket, *r*, attached to a frame by a screw-bolt passing through an elongated slot, or otherwise connected to admit of adjustment, so that the cog-wheel and pinion can be taken off and the position of the stud varied, to permit other cog-wheels of different sizes to be substituted, to vary the relative speed of the rotary and longitudinal motions of the mandrel *c*, and thereby admit of making the twist to be cut of any desired pitch.

The operation of cutting the helical groove in the blank is performed whilst the mandrel is moving longitudinally, and when the groove is cut to the desired extent, the movement of the mandrel *c* is stopped automatically, by throwing the worm *g*, on the driving-shaft, out of gear with the worm-wheel *j*, by a cam, *s*, on the mandrel, which cam at the proper time pushes a slide, *t*, on the under side of the cross-bar *d* of the frame.

For this purpose, one end of the driving or worm-shaft *h* is mounted in the lower arm of a lever, *u*, which turns on a fulcrum-pin, *v*. The upper arm of this lever has sufficient spring to be held in place by a shoulder or catch on the frame while the worm *g* is in gear; but when the slide *t* is pushed out by the cam *s*, it disengages the upper arm of the lever *u* from the catch, and the lower arm is then forced outward by a spring, *w*, to throw the worm out of gear and stop the revolution and advancing movement of the mandrel.

After this disengagement of the worm, the mandrel can be run down rapidly by a crank-handle, $a^1$, on a short horizontal shaft, $b^1$, which communicates motion by the bevel-cog wheels $c^1$ $c^1$, to the vertical shaft *k*.

The tubular guide, by which the blank is held firmly in its proper position relatively to the toothed cutter during the cutting of the groove, is represented at *z*. This guide is secured in a socket in the frame of the machine, in the vicinity of the toothed cutters. Its aperture is fitted to the size of the blank, so that the latter can just traverse it, and as the guide is tubular, it sustains the blank against lateral pressure in every direction.

The revolving arbors $f^1$ $f^1$ of the toothed cutters are arranged and operate at opposite sides of the axial line of the mandrel *c*, and consequently at opposite or different sides of the blank, each cutter cutting one groove; and in this way I am enabled to cut the twist-grooves in one half the time heretofore required. Moreover, the tendency of one cutter to spring the blank, heretofore experienced, is counteracted, more or less, by the action of the other cutter in the opposite direction.

The poppets which carry the two toothed or burr-cutters, as before stated, slide in parallel ways, and the depth of cut to be made may be determined by an adjustable gauge, $q^1$. Before starting the machine, each poppet is pushed against its gauge.

Figure 11:
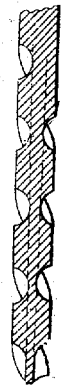
Figure 11 is a longitudinal section of a twist-drill.
Figure 8:
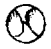
Figure 9:
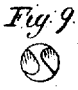
Figure 9 is an end view of such a drill when finished.

The grooves of twist-drills are generally made of the greatest depth at the cutting-end of the drill, and of gradually less depth toward the shank, so that the depths of the groove at different parts of its length are unequal, as represented by dotted lines in the separate fig. 11, representing a section of such a drill.

In order that grooves of unequal depth may be automatically cut by the machine I am describing, the poppet *e* of each revolving arbor $f^1$, that carries the toothed cutter, is so combined with the revolving mandrel *c*, (which turns the blank and moves it past the cutters,) that the distance between the axial line of the mandrel and the peripheries of the toothed cutters is changed as the mandrel advances longitudinally.

The mode in which the combination is effected in the machine I am describing is as follows:

There is a collar, $r^1$, on the upper end of the mandrel *c*, and which, for adjustment, can be shifted and fastened by a temper-screw, at any desired distance from the upper end of the mandrel.

A lever, $s^1$, that turns on a fulcrum-pin at $t^1$, bears by a roller or pin on the surface of the collar $r^1$, and therefore that end of the said lever will be elevated as the mandrel rises.

The opposite end of the lever is slotted, and embraces an adjustable pin, $u'$, on the lower end of a sliding cogged rack, $x'$, which engages the cogs of a pinion, $w'$, on the end of a screw-shaft, $z'$, mounted on the top of the auxiliary frame $d^1$, and the thread on this shaft engages and slides the poppet, so that as the mandrel, with its coller $r^1$, advances, the lever depresses the cogged rack which turns the screw-shaft, and this in turn slides the poppet, with the toothed cutter, gradually from the axis of the blank.

When the operation is completed, the rack is disengaged from the pinion on the screw-shaft, to admit of moving back the poppet to its place of starting, against the gauge $q^1$, by a crank-handle, $y'$. This disengagement of the rack is effected by turning a button, $z'$, situated behind the rack.

To adjust the parts to increase or decrease the range of motion, the fulcrum-pin on which the lever $s'$ vibrates is made variable in position by being secured in a slot of the bracket from which it projects, so that it can be set near to or further from that end of the lever which bears on the collar; and, in like manner, the pin which is acted upon by the other arm of the lever is fitted and secured in a slot in the lower end of the cogged rack. The other poppet is provided with a like arrangement.

The parts being adjusted, the mandrel let down, a blank inserted, and the poppets of the cutters set up against their gauges, and the machine started, the mandrel will revolve and also advance or move longitudinally, so as to present the point of the blank to the toothed cutters, which gradually cut the two grooves, as the mandrel continues to turn and move the blank longitudinally, both motions being so timed and relatively proportioned as to give the desired twist or helical form to the two grooves. As these motions proceed, the blank is sustained in its position by the tubular guide, and the two toothed cutters are gradually moved from the axis of the blank to reduce the depth of cut; and in this way, and at one operation, the two helical grooves to form a twist-drill are cut simultaneously, and without strain on the blank.

If the helical grooves are to be cut of unequal depth throughout their whole extent, the collar is set in such position upon the mandrel *c* that it begins to act upon the levers $s'$ $s'$ as soon as the cutters begin to operate upon the blank; but if the bottoms of the grooves are to be of uniform distance from the axis of the blank for a certain distance, the said collar $r^1$ is set in such position upon the mandrel that it does not begin to act upon the levers $s'$ $s'$ until the mandrel *c* has moved the blank the said distance past the cutters.

In finishing twist-drills, I have found it expedient to use the form of toothed cutter called cherry-cutters in place of the discoid-cutters, represented in figs. 1, 2, 3, and 4.

The mode of applying the cherry-cutters is represented in figs. 5 and 6.

For convenience I take off the auxiliary frame, above described, from the main frame, and substitute therefor the auxiliary frame $a^2$, which is, in all essential respects, like it.

The poppets $b^2$ $b^2$ slide in parallel ways on the top of this frame, $a^2$, and are adjusted, by screw-shafts $c^2$ $c^2$, with crank handles.

The cherry-cutters $d^2$ $d^2$ are semispherical at their front ends, and conical at their rear ends.

They are secured in the front ends of two arbors $e^1$ $e^2$, each carrying a cone of pulleys, $f^1$, to receive the driving-belt.

Each cutter-arbor is fitted to turn in a sleeve, $g^2$, the outer periphery of which is threaded and tapped in the poppet, and the outer end of the sleeve is provided with a cog wheel, $h^2$, which engages and is turned by a cogged rack, $i^2$, connected with the lever $j^2$, operated by the collar $r^1$, on the mandrel $c$, as already described, for cutting the grooves of gradually less depth with the discoid-cutters.

By the arrangement last described, the two grooves cut by the discoid-cutters are enlarged, the semispherical end of the cherry-cutters finishing the bottom of the two grooves, which form the twist-drill, and the conical part of the cutters, forming the sides of the grooves, so that when the end of the drill is ground off to a bevel, the cutting-edges thereby formed will be straight.

I have thus described and represented the mode of construction which I have tried with success, and which I prefer, but I do not wish to be understood as limiting my claim of invention to such mode of application, as it may be varied by the substitution of mechanical equivalents having the same mode of operation.

I claim as my invention, and desire to secure by Letters Patent, the following combinations of instrumentalities, viz:

1. The combination of the revolving cutter-arbor, revolving mandrel, advancing-mechanism, and stop-mechanism, substantially as before set forth.

2. Also, the combination of two revolving cutter-arbors, revolving mandrel, advancing-mechanism, and stop-mechanism, substantially as before set forth.

3. Also, the combination of the revolving cutter-arbor, revolving mandrel, advancing-mechanism, and variable stud, substantially as before set forth.

4. Also, the combination of two revolving cutter-arbors, revolving mandrel, advancing-mechanism, and variable stud, substantially as before set forth.

5. Also, the combination of the revolving cutter-arbor, revolving mandrel, advancing-mechanism, and tubular guide, substantially as before set forth.

6. Also, the combination of two revolving cutter-arbors, revolving mandrel, advancing-mechanism, and tubular guide, substantially as before set forth.

7. Also, the combination of the revolving cutter-arbor, revolving mandrel, advancing-mechanism, and poppet, substantially as before set forth.

8. Also, the combination of the revolving mandrel and advancing-mechanism, with two revolving cutter-arbors, and two poppets, substantially as before set forth.

9. Also, the combination of the revolving cutter-arbor, revolving mandrel, advancing-mechanism, poppet, lever $s'$, and variable fulcrum, substantially as before set forth.

10. Also, the combination of the revolving mandrel and advancing-mechanism, with two revolving cutter-arbors, two poppets, two levers, $s'$, and two variable fulcra, substantially as before set forth.

11. Also, the combination of the revolving cutter-arbor, revolving mandrel, advancing-mechanism, variable stud, changeable cog-wheels, and stop-mechanism, substantially as before set forth.

12. Also, the combination of the revolving cutter-arbor, revolving mandrel, advancing-mechanism, stop-mechanism, and tubular guide, substantially as before set forth.

13. Also, the combination of the revolving cutter-arbor, revolving mandrel, advancing-mechanism, stop-mechanism, and poppet, substantially as before set forth.

ANDREW R. ARNOLD.

Witnesses:

ALBERT BEACH,
STEPHEN C. MOREHOUSE,
WM. BRADSHAW.